United States Patent [19]

De Bijl et al.

[11] 4,145,745
[45] Mar. 20, 1979

[54] ADDRESS CONVERSION DEVICE FOR SECONDARY MEMORIES

[75] Inventors: Adrianus M. J. De Bijl; Hans Cramwinckel, both of Beekbergen, Netherlands

[73] Assignee: U.S. Philips Corporation, New York, N.Y.

[21] Appl. No.: 809,114

[22] Filed: Jun. 22, 1977

Related U.S. Application Data

[63] Continuation of Ser. No. 640,703, Dec. 15, 1975, abandoned.

[30] Foreign Application Priority Data

Dec. 20, 1974 [NL] Netherlands ................. 7416631

[51] Int. Cl.² ................ G06F 5/00; G06F 13/00
[52] U.S. Cl. .................................................. 364/200
[58] Field of Search ......... 364/200 MS File, 900 File; 365/130; 360/72

[56] References Cited

U.S. PATENT DOCUMENTS

| | | | |
|---|---|---|---|
| 3,354,429 | 11/1967 | Macon et al. | 364/200 |
| 3,366,928 | 1/1968 | Rice et al. | 364/200 |
| 3,375,507 | 3/1968 | Gleim et al. | 360/72 |
| 3,403,384 | 9/1968 | Cushing et al. | 364/200 |
| 3,431,558 | 3/1969 | Capozzi | 364/200 |
| 3,466,611 | 9/1969 | Weinberger | 364/200 |
| 3,467,949 | 9/1969 | Moore | 364/900 X |
| 3,525,081 | 8/1970 | Flemming, Jr. et al. | 364/200 |
| 3,537,072 | 10/1970 | Macon et al. | 364/200 |
| 3,564,513 | 2/1971 | Hibner | 364/200 |
| 3,623,022 | 11/1971 | Day | 364/200 |
| 3,631,421 | 12/1971 | Perkins | 360/72 X |
| 3,668,647 | 6/1972 | Evangelisti et al. | 364/200 |
| 3,701,981 | 10/1972 | Schouten et al. | 365/130 X |
| 3,727,203 | 4/1973 | Crossman | 360/72 |
| 3,792,442 | 2/1974 | Koeijmans | 364/200 |
| 4,017,838 | 4/1977 | Breyer | 364/200 |

*Primary Examiner*—Melvin B. Chapnick
*Attorney, Agent, or Firm*—Thomas A. Briody; James J. Cannon, Jr.

[57] ABSTRACT

An address conversion device for use with computer systems including a central processing unit and peripheral memory storage devices, such as discs, tapes and bubble memories, which serve for secondary data storage and in which binary data elements are stored in sequential addressable storage sectors. Such storage sectors have precise physical locations on the peripheral storage units. The address conversion device includes a first conversion unit which controls the conversion of user program addresses to logical addresses reflecting the logical structure of the data files stored in the peripheral storage units and a second conversion unit which converts the logical addresses to precise physical addresses of sectors of the secondary storage units in the form of electrical signals, such that the secondary storage units can be addressed as if they were random access units. Replacement of one type of secondary storage unit by another requires only a programmed change of quantitative parameters in the program controlling the address conversion device.

31 Claims, 5 Drawing Figures

ADDRESS CONVERSION DEVICE FOR SECONDARY MEMORIES

This is a continuation, of application Ser. No. 640,703, filed Dec. 15, 1975, now abandoned.

BACKGROUND OF THE INVENTION

This invention pertains to an address conversion device for use with a computer system having a central processing unit, peripheral memory devices, such as discs, tapes or bubble memories, which serve as secondary data storge units and wherein binary data elements are stored in sequential physical locations within physically defined addressable storage sectors under the control of the physical addresses generated by the address conversion device. The address conversion device of this invention includes two units, hereinafter designated the first conversion unit and the second conversion unit. The first conversion unit in conjunction with the central processor converts user program addresses into generalized logical addresses which reflect the logical file structure of the data stored in the secondary storage units. The second conversion unit converts the logical addresses generated by the first conversion unit into addresses of physical storage locations in the form of electrical signals to a specific secondary storage unit, such that data may be read or written as though the secondary storge device were a random access memory. The address conversion device operates under the control of the central processor and its first and second conversion units may share calculating members with the central processor.

Computer systems using address conversion means are taught in the prior art. The system may include a central processor having a control unit which may include, for example, an internal storage unit (control memory) wherein a machine program is stored. The user address instructions for the secondary storage unit can be generated under the control of a user program (application program). Or they can be externally furnished, for example, by means of a keyboard. The program instructions may relate to the updating of a data file. The logic address instructions generated by the first conversion unit must subsequently be converted into physical address signals. Logic address instructions are to be understood to mean herein address instructions wherein the hierarchically arranged address elements differ from each other only as regards their position in the hierarchical sequence, without the electrical or mechanical properties of the secondary storage unit having an effect; the logic address is independent of the time dependent access process of the secondary storage unit. The logic address is, in effect, a counter position. The user address, however, need not contain any indication of a sequence, but may consist of an identification of a file and an object within a file, for example, "customer, Peter." This user address is converted, by reference to a table, stored for the data control in the main memory unit into two logic addresses which indicate the starting address of the file "customer" and the relative address in the sequence of the customers, respectively. The logic address can be formed and gives a relative address in the sequence of storage positions, in the secondary storage unit beginning with the first storage position. The secondary storage unit is thus addressed in the same manner as a random access memory, the most obvious example thereof being a memory composed of storage matrices. The physical addresses, however, have portions which are directly related to the spatial configuration of the secondary unit and hence to the construction of the storage unit. The physical addresses may include address portions which result in the secondary storage unit being accessible at random, periodically accessible, accessible in a delayed manner, conditionally accessible, or being accessible in any desired manner. Examples thereof are that a physical address portion may select one disc from a disc unit, another physical address portion may relate to the angular shift of a disc storage unit, another physical address portion may relate to a position on a magnetic tape or a position of a movable magnetic head of a disc storage unit, and another physical address portion may relate to information stored in a buffered storage section. The physical address is important if a number of storage positions are sequentially accessible, because the exchange of information between the central processor and the secondary storage unit must satisfy severe synchronization requirements. Storage units of this kind are inexpensive.

For converting logical addresses into physical addresses, it is known to use a conversion unit which controls the data file and which is controlled, for example, by a specific machine program which is stored in the main memory unit of the central processor. If the data file is also controlled by the machine program, this program must contain a substantial amount of information with respect to the physical organization of the data storage in the secondary storage unit. U.S. Pat. No. 3,366,928 describes such a computer system utilizing magnetic tapes as a secondary storage means. The main memory of this system contains a correspondence table to derive hierarchical address portions. For this purpose, the main memory contains for each data file an identification of a tape, a physical subaddress, and a sequence of logic block numbers indicating the length of each block. Thus, block numbers are neither logical nor physical address portions, since they have a significance only due to the accumulated length of the preceding blocks. In the present state of the art, the physical addresses are derived from this data. To determine the data contained in the main memory is difficult because the main memory includes extensive information with respect to the physical location of the data stored in the secondary storage units.

The principal object of the present invention is to provide a programmable address conversion device to convert user program addresses into generalized logical address instructions and these logical address instructions to addresses of physical storage locations in a secondary storage unit, thus simplifying the reading or writing of data in the secondary storage unit. Thus, if the secondary storge unit is modified or replaced with a different type of unit, only the address conversion program need be modified. This program modification may concern the capacity of a secondary storage unit or a subdivision thereof, with the result that the upper limit of a physical sub-address is modified. It may also concern the organization of the secondary storage unit, such that a physical address which was accessible in a sequential manner becomes accessible at random. For example, a magnetic disc is provided with a magnetic head for each storage track. The contents of the main memory must also be changed if the logical organization of the data files in the secondary storage unit is changed. This occurs if the quantity of data in a file increases, so that more storage space is required. In the present state of the art the address instructions of the main memory can be used only for a specific system configuration, or in other words they cannot be generally utilized to address other peripheral storage devices. Likewise, if operations must be executed in specific devices in accordance with the program instructions of the main memory: modifications in the secondary storage unit would require that these instructions would also have to be modified.

SUMMARY OF THE INVENTION

The principal object of the present invention is to provide a programmable address conversion device which enables a secondary storage unit to be addressed by the machine program as if it were a random access storage unit. A second object is to provide and address conversion unit which permits a secondary storage unit to be addressed by the machine program without regard to the physical properties of the secondary storage unit. Another object is to provide a means for simple and rapid interchangeability of a secondary storage units having different physical and logical properties without modification of program instructions in the central processor.

The objects of the present invention are achieved by providing a programmable address conversion device having a fixed logical structure which converts user program addresses in program instructions into generalized logical addresses relating to logical file organization and then converts these into physical addresses of sectors of secondary storage units. The address conversion device includes a calculating member for use in these address conversions. Since each specific secondary storage unit may be physically subdivided into blocks of fixed, uniform length and each block is further subdivided into a fixed number of sectors of uniform length, the address conversion device converts the logical addresses of a program into physical address of a specific secondary storage unit utilizing a minimum number of parameters related to the physical data capacity. The values of these parameters are the upper limits of the physical addresses for each subdivision of the secondary storage unit. The use of storage sectors of uniform length within storage blocks of uniform length results in a major simplification of adress conversion, because these lengths are used as two parameters in the address conversion device, thus achieving a high degree of modularity. Modifications in the physical organization of the secondary storage unit require only corresponding modifications in the values of these parameters. The generalized logical addresses can thus remain unchanged. The absence of an extensive mapping table eliminates the necessity of reprogramming the central processor when such modifications are made in the secondary storage units. The address conversion device of the present invention performs predetermined address conversion operations each time it is addressed without regard to the data to be retrieved from the secondary storage unit.

Thus, the address conversion device of this invention relates to three respective address levels; the user address of the application program, the logical address generated by the machine program of the central processor, and the physical address necessary for reading or writing data from or onto a secondary or uaxiliary memory. The machine program does not know the physical properties of the secondary memory. The address conversion device provides this conversion.

If the secondary storage unit is a disc unit, each storage block is a subdivision of a storage region having a uniform number of blocks specific to the disc. In this case, storage sectors are addressed in a three-dimensional space. Each physical address for the disc will have three parts, while retaining the modular organization of the address. The address conversion device retains a simple structure, even when the disc has a large capacity.

Preferably the disc comprises a plurality of magnetizable disc surfaces whereon the three address portions identify the cylinder surface, magnetic head and track sector, respectively. There are many possibilities for the design of a magnetic disc, so it is particularly advantageous that the program which performs the address conversion on the basis of the user addresses is not aware of the characteristics of the disc, such as the number of discs or tracks, and that the program is limited to the generation of logical addresses.

If secondary storage unit contains information in the form of magnetic domains a physical address can then consist of a number of address portions, the subdivision of the physical address being dependent on the selected type of magnetic domain memory. A magnetic domain storage unit can be addressed in exactly the same manner as a disc storage unit, utilizing the same logical address portions.

Likewise, a secondary storage unit can include a shift register or storage matrices. In either case, the address conversion device of the present invention can be utilized if the stored data is sequentially addressed. Logical addresses do not depend on whether or not the secondary storage unit has random access.

Preferably the calculating member of the address conversion device is part of the central processor, its dual use resulting in a material saving. The calculating member can be temporarily under the control of the address conversion device when required.

The address conversion device of this invention has common terminals with the secondary storage unit for the logical addresses converted into physical address signals and common connection terminals for data transmission. Replacement of a secondary storage unit requires only the exchange of connections, resulting in plug-to-plug compatibility.

DESCRIPTION OF THE PREFERRED EMBODIMENTS

Figure 1:
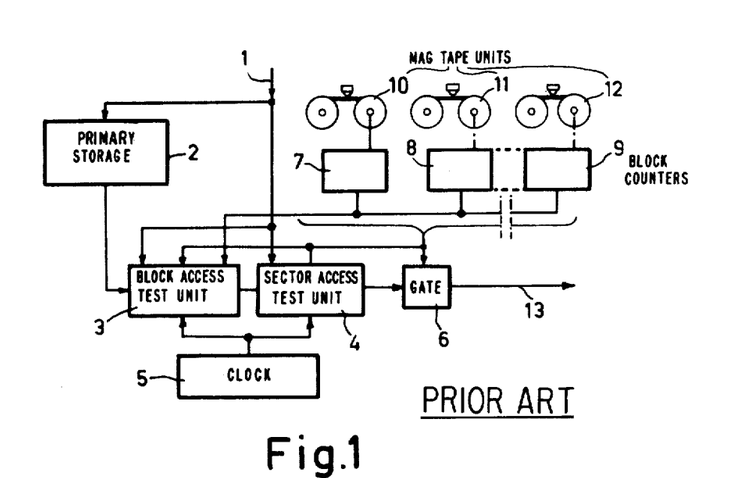
FIG. 1 is a block diagram showing block and sector addressing of peripheral storage units of a computer system in the present state of the art.

FIG. 1 shows the computer system illustrated in FIG. 1 of U.S. Pat. No. 3,366,928, which is representative of the present state of the art. The system comprises an input terminal 1 for user program. The user program could relate to updating a file or retrieving information from a data file. A user program instruction includes, for example, an identification of the file, an identification of a section of the file, for example, a number, and a modification of all or part of the information. The teaching of this invention will not be considered herein, because the present invention does not specifically relate thereto. In this system the main memory 2 contains a display table which when addressed by the identification of the file, can provide an identification of one of the magnetic tape apparatus 10, 11, 12, an identification of one or more blocks thereon, and the lengths of the relevant blocks. The primary storage thus implicitly contains the entire organization of the data contents of the tape apparatus, which is co-determined by the physical properties thereof, for example, the block length per tape, the number of tapes, and the capacity per tape. Under the control of the clock 5, the block access test unit 3 and the sector (record) access test unit 4 select a given sector, by comparison of the number within the file, the block lengths stored in the principal storage 2, and the positions of the block counters 7, 8, 9 of the selected tape unit. For data retrieval, when the desired sector has been selected, gate 6 is opened, causing the data in that sector to be read and transmitted to the central processor over data transmission line 13. A write cycle operates in the same manner. Systematic position errors occur frequently when data is rewritten in a magnetic tape unit. After a few successive read/write cycles, the data intended for one sector is liable to be written in an adjacent sector. Replacement of one tape unit by a tape unit of a different type necessitates reprogramming of the main memory 2. This is an extensive reprogramming operation because it must include the machine control program and the address reference table generated by the machine control program. Similar complex program changes are required if the organization of the data files in the tape units is changed.

Prior art tape systems have a further drawback in that, given the rank of an address in a file, all block lengths within the file must be successively subtracted from the rank number until the remainder is smaller than the block length. A large number of subtractions may be required for this purpose, each subtraction involving a different minuend, so that the primary storage 2 must be interrogated a corresponding number of times.

Figure 2:
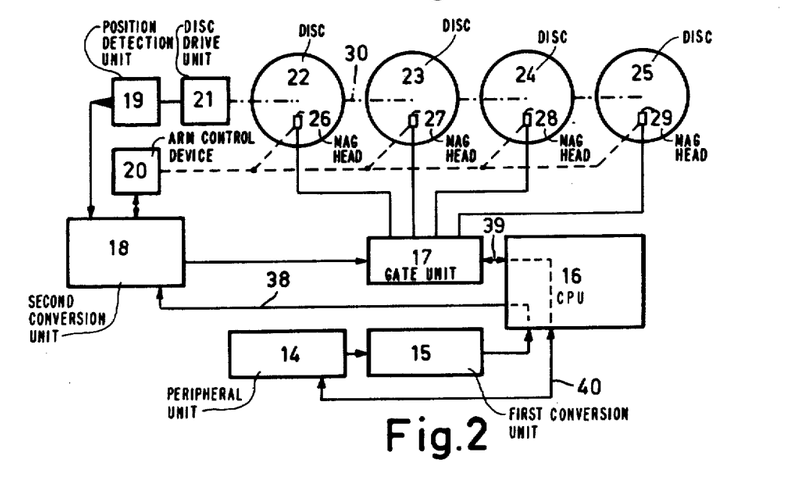
FIG. 2 is a block diagram showing block and sector addressing of peripheral storage units of a computer system using the address conversion device of the present invention.

FIG. 2 shows a computer system incorporating the address conversion unit of the present invention, comprising a peripheral input apparatus 14, a first address conversion unit 15, a central processor 16, a second address conversion unit 18, disc arm control device 20, a disc (angular) position detection unit 19, a disc drive unit 21, a gate unit 17, and four discs 22 through 25 with associated magneticheads 26 through 29. Peripheral input apparatus 14 may be any known type such as an intelligent terminal having an input/output means including a keyboard, a display, a microprocessor, its own memory and its own program storage capability. Or, peripheral input unit 14 may be a memory device wherein a user program is stored. The address conversion device of the present invention includes two units, hereinafter referred to as the first conversion unit 15 and the second conversion unit 18. First conversion unit 15, as described hereinafter, converts in conjunction with central processor 16 user program addresses into generalized logical addresses. Second conversion unit 18 converts these logical addresses to physical addresses of a specific secondary storage unit in the form of electrical signals. Conversion units 15, 18 may be one physical device. They also may include arithmetic members or share arithmetic members of the central processor 16. When data is to be retrieved from a disc, the data is identified by a binary representation of the user program address in the form of a partial logical address which is then tramsitted to the first address conversion unit 15. In the user instruction, the identification of the data could be "customer, Peter." The disc is thus addressed as if it were a random access memory. First address conversion unit 15 includes a memory wherein thee word "customer" appears in binary representation which, for purposes of further exposition, will be "01" When "0" is transmitted to first conversion unit 15, unit 15 retrieves a specific word which identifies the initial logical address of the file "customer" and the length of that file.

Figure 3:
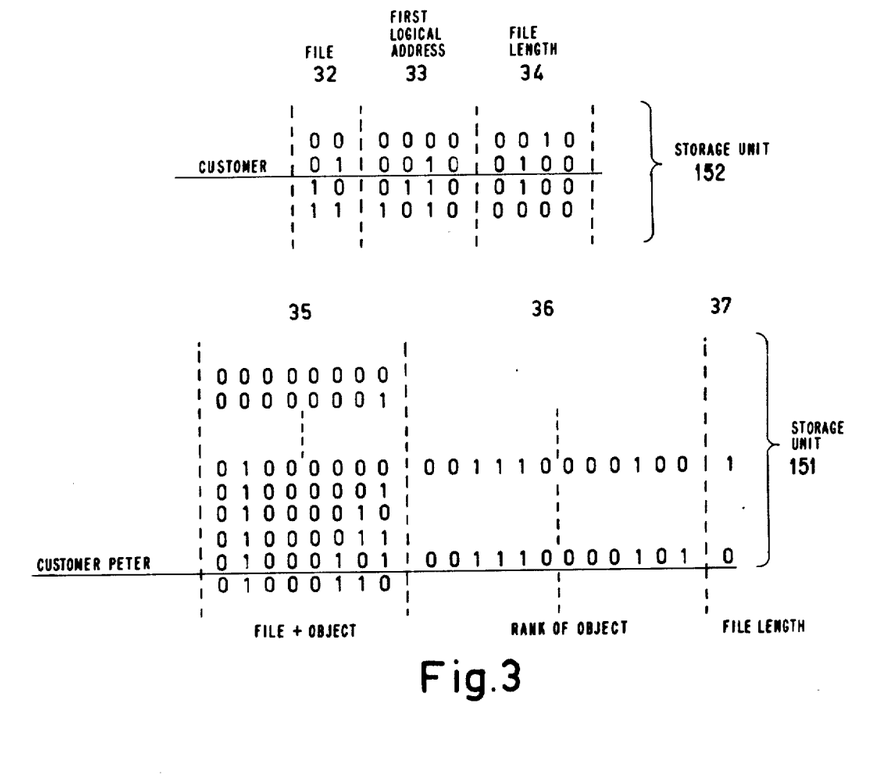
FIG. 3 illustrates the address contents of the first address conversion unit of the present invention.

FIG. 3 illustrates the address contents of the first address conversion unit 15 of the present invention. The addresses shown in FIG. 3 are stored in storage units 151 and 152 of FIG. 4.

In FIG. 3, column 32 indicates the address in first conversion unit 15 of the binary word assigned to a file; column 33 indicates the first logical address of the file "customer" in the secondary storage unit and column 34 indicates the length of that file. When the file "customer" is addressed in first conversion unit 15 as 01, the first logical address of that file 0010 and the file length 0100 will be fed to the output terminals of the memory of first conversion unit 15. First conversion unit 15 also includes a second memory (which may be physically integrated with its first memory from which a specific binary word is also retrieved by the user identification "customer, Peter." The identification "customer, Peter" is represented by the eight bit binary word 01000101 in column 35, the first and most significant two bits representing the identification of the file "customer." At the storage location of the addressed file word, the relative rank within the customer file (column 36) and the physical length of the data stored in that file (column 37) are stored. Thus, the rank of "customer, Peter" is 0011.1000.0101, (901 in decimal notation) and the physical length of the file is 0, meaning that a single storage sector is assigned to this customer. In the embodiment shown in FIG. 3, at the most two sectors are assigned to the same customer. The advantage of the separate storage of the first logical address of the file and the rank number within the file is that a storage region can be asssigned to additional data by a simple modificationof the first stored binary identification (columns 32, 33, 34), The logical addresses and the lengths in columns 33, 34, identify the most significant address portions, so that a logical address contains a large number of information units. For example, if the eight least-significant address bits are not stored, the length will be $4 \times 2^8 = 1024.$, so that the last address is 0 1 0 1. 1 1 1 1 1 1 1 1. The logical file 11 is empty in FIG. 3, and the remaining space can be filled by a file of arbitrary length (provided it is smaller than 0110). If a new file is to be stored, first all logical addresses of column 33 are examined and, when an empty storage space is found, the program determines whether the file fits therein. Operations of this kind are commonly performed, so they will not be elaborated herein. The customer number formed as discussed in reference to FIG. 3, or supplied directly is added to the first logical basic address until a logical address is formed which does not contain information with respect to the physical position in the secondary storage or the physical properties of the secondary storage. This address contains only the rank of the addressed storage position within the disc store. If all logical addresses comprise twelve bits, the logical address of "customer Peter" is then 0 0 1 0. 0 0 0 0 . 0 0 0 0, (from column 33,) increased by 0 0 1 1. 1 0 0 0. 0 1 0 1 (901), (column 36,) so as to form the sum 0 1 0 1. 1 0 0 0 0. 0 1 0 1 (1413). Customer "901" means the 902nd in rank, because the first customer has the "rank" 0. In this example the memory therefore can indicate 4096 sectors - from the conversion unit 15 (additional address bits which are not shown can possibly be present in that memory for later extension of the disc units 22 through 25.

Figure 4:
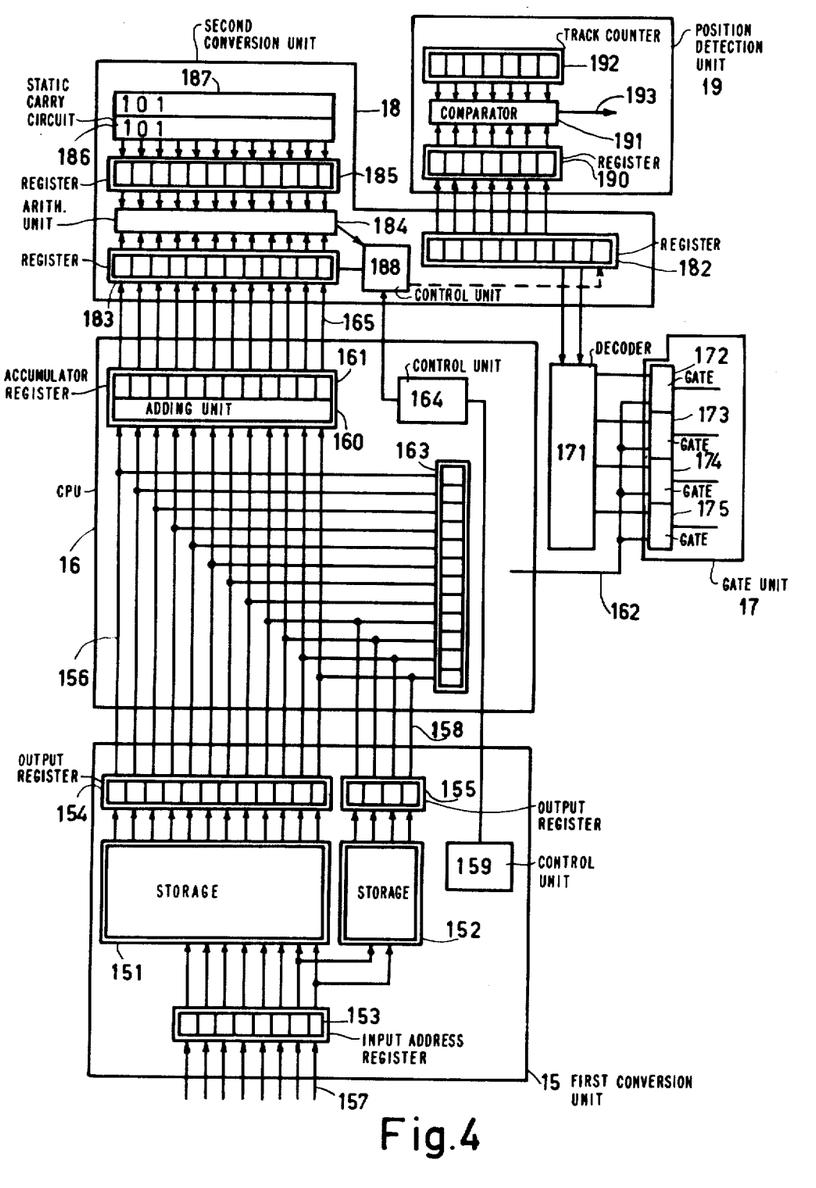
FIG. 4 shows one embodiment of the address conversion device of the present invention for use with disc storage units.

FIG. 4 is a block diagram of address conversion device in its preferred embodiment for use with a disc storage system. First conversion unit 15 includes an input address register 153 wherein the input "customer, Peter")01000101 (column 35, FIG. 3)) arrives from the peripheral unit 14 over data transmission lines 157. The first two most significant bits select the information 0010 (column 33, FIG. 3) in first storage memory 152. The complete input word selects the rank information 0011.1000.0101 (901), (column 36, FIG. 3), in second storage memory 151. These binary representations of "customer, Peter" and his file rank are then sent to output register 154. The first address (basic address, 0010 (column 33, FIG. 3)) is sent to output register 155. Thus, first conversion unit 14 decodes and multiplexes the signals received on input lines 157 into two parts which are then fed to storage units 151, 152 to select the data fed to output registers 154, 155 respectively.

If the user program generates the customer number directly, its binary representation is fed directly to output register 154, (not illustrated).

The outputs of the registers 154 and 155 are connected, by the lines 156, 158, to the twelve and four, respectively, most-significant bit positions of the twelve bit positions of the adding member 160 of the central processor 16. In the accumulator register 161 the sum of these two outputs from registers 154 and 155 of the unit 15 is derived as described in reference to FIG. 3. Adder 160 in central processor 16 is used for other purposes and is shown connected to the outputs of register 163 which is not involved in the conversion device of this invention. Thus, in the address conversion process the central processor 16 serves as a demultiplexer of the signals received from output registers 154, 155 and 163 (if applicable) before these signals are fed to the accumulator register 161. Control units 159, 164, and 188 simply transmit a "ready" signal to enable the operation of the next unit. This is conventional architecture for a computer system. Output lines from register 161 to the memory of central processor 16 are omitted. The device which controls the operations of units 15 and 16 in a synchronized manner and which protects against customer number overflow is also not shown. Protection devices are disclosed in U.S. application Ser. No. 317,219 filed Dec. 21, 1972 (now abandoned) which is continued as application Ser. No. 475,744 filed June 3, 1974 (now abandoned). Discs 22 through 25 as shown in FIg. 2 (one disc can have one or two storage surfaces) all comprise the same number of tracks for information storage, for example, 20 tracks, and each track comprises the same number of sectors, for example, 50 sectors. An alternative structure could be 100 tracks of 10 sectors each per disc. Each sectior accommodates the same quantity of information, for example, 256 byes ($2^{11}$ bits). The discs are rotated together by the disc drive unit 21 by way of the shaft 30 which is denoted by a stroke-dot line. Rotation is at a uniform speed and the disc position detection unit 19 continuously applies a signal to track counter 192 of the second conversion unit 18 to indicate the instantaneous rotation position. The magnetic heads 26 through 29 are simultaneously radially moved across the discs 22 through 25 by means of the arm control device 20 by way of the arms denoted by a broken line. As a result, four tracks are addressed at the same radial position relative to each other. Obviously, the organization of the heads may be different, for example, a stationary head for each track or multiple, movable heads per disc surface. A preferred organization is that the sectors of a track have successive sector numbers, for example, from 0-9, all sectors "0" then being situated in the same tangential position. The disc surfaces are numbered from 0 to 3, and the tracks are numbered from 0 to 99, going inwards from the outside.

The logical address generated in register 161 is fed by line 38 of FIG. 2 or corresponding lines 165 of FIG. 4 to register 183 of second conversion unit 18 to derive the physical address in terms of the track number, the disc number and the sector number. The algorithm for this derivation is as follows. Each track is divided into 40 sectors Thus, the logical address is divided by forty (0 0 0 0. 0 0 1 0 1. 1 0 0 0), the quotient determinning the track number and the remainder being saved. In the present example 1413 : 40 = 35 (0 0 0 0. 0 0 1 0. 0 0 1 1) with the remainder 13 (0 0 0 0. 0 0 0 0. 1 1 0 1), the first six bits of the remainder always being identical to zero. Under the control of the number 35, the arm control unit 20 is activated and the magnetic heads 26 through 29 are positioned opposite the track 35 (which is the thirty-sixth track because the track number 0 also exists). Simultaneously, the remainder 13 (. . . 0 0 1 1 0 1) is divided by 10 (. . . 0 0 1 0 1 0) by the second conversion unit 18. The quotient 1 (. . 0 1) gives the disc number, in this case that of the second disc 23, the remainder 2 (. . . 0 1 0) giving the sector number, in this case the third sector because the sector number zero also exists.

FIG. 4 illustrates a physical means to implement this algorithm in second conversion unit 18. The output of the accumulator register 161, a logical address, is fed by the lines 165, to register 183, as the numerator in second conversion unit 18. The output of register 183 is fed to an arithmetic unit 184. Register 185 for the denominator is filled from the static carry register 186, the binary representation of the number of sectors per track (40). The arithmetic unit 184 subtracts the contents of the register 185 from the contents of the register 183, and returns the remainder to the register 183. If the numerator (remainder) was larger than the denominator, this is detected by the control unit 188 and, by the connection denoted by a dotted line, a binary "1" is fed to the quotient register 182. If the numerator (remainder) was smaller than the denominator, the denominator is added again to the remainder which is now negative. A control unit similar to that of 188 is disclosed in U.S. Pat.

No. 3,735,108, incorporated herein by reference. In both cases the registers 183 and 182 receive a shift pulse over one bit position from the control unit 188. In this case the track number will be known after seven subtractions. The register 185 for the denominator is then filled with the binary representation of ten from the static carry register 187; this is the representation of the number of sectors per track. In the present example, the number of discs is a power of $2(2^2)$, and as a result the factors of the static carry registers 186, 187 is the same, but this need not necessarily be so. The static carry registers 186, 187 can be loaded by setting a number of switches when another disc of a given type is installed. After two further subtractions, the track number is also known in this case. The track number is applied from register 182 to register 190 and is compared with the position of the track counter 192 by the comparator 191. The result of the comparison is used for controlling the disc unit by line 193. When a track is passed, the track counter is increased or decreased by one unit by means of a track detector (not shown). The two next-lower bits in the register 182 representing the disc number, are decoded in the decoder 171 to form a 1-out-of-4 code, so that only one of the four gates 172 through 175 to disc units 22 through 25 is unblocked. These gates form part of the gate unit 17 to conduct a signal to only one of the magnetic heads 26 through 29. The remainder in the register 183 indicates the sector number and is compared (in a manner not shown) with the sector position detected by disc position detection unit 19. If the comparison device 191 supplies the signal "correspondence", a central control unit (not shown) actuates one of gates 172 through 175 to the relevant sector so that data can be fed to and from the central processor 16 by line 162 for a read or write operation. Control units 159 and 154 determine the priority of operations between first conversion unit 15 and central processor 16 with respect to adding unit 160. This invention does not specifically relate thereof, so this will not be elaborated herein. The function of arithmetic unit 184 could be performed by a calculating member of central processor 16. Central processor 16 can include memory registers in which the data of one or more disc sectors can be temporarily stored. The disc unit then functionsd only as a secondary or auxiliary storage unit. Neither the central processor 16 nor the peripheral units 14 nor the first conversion unit 15 need contain a mapping table of the secondary storage unit to calculate physical addresses of data files.

The described example related to four discs comprising ten sectors per track. If these factors are changed, only the data in the static carry 186, 187 need be changed. All other factors are unchanged because the input signals to the sector counters are not affected. These factors are in register 185. If the number of tracks is increased from 100 to 200 per disc, comparison in the unit 191 changes: in that case another bit of highest significance must be taken into account. If the number of discs is changed, the decoder 171 and the denominator in the register 185 changes. First conversion unit 15 remains unchanged, provided that the value of the highest possible address fits in the unit. Referring back to FIG. 2, line 38 transmits physical addresses and lines 39, 40 transmit data.

FIG. 4, thus, presents a first embodiment of the address conversion device of this invention using calculating members to effecct the address conversions. A second embodiment described hereinafter with reference to FIG. 5 uses counters rather than calculating members.

Figure 5:
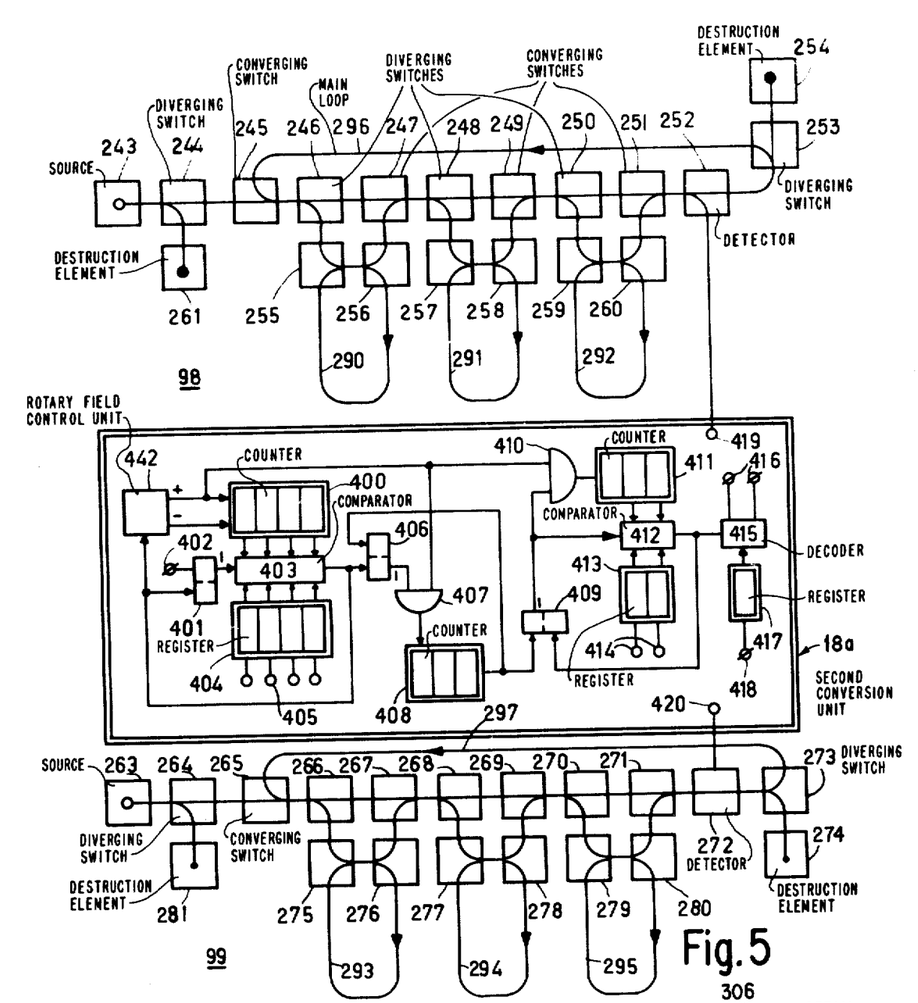
FIG. 5 shows a second embodiment of the second address conversion unit of the present invention for use with a magnetic bubble storage unit.

FIG. 5 illustrates the utilization of the present invention in a system having a magnetic bubble memory as its secondary storage unit. Secondary storage units of this type are known from U.S. Pat. No. 4,091,459. Reference is made to the article by P.C. Michaelis et al, "Magnetic Bubble Repertory Dialer Memory", Proceedings 1971 Intermag Conference, IEEE Trans. MAG, 1971, page 737 ff, as further example of the background of the invention. A bubble memory comprises domain guide structures composed of discrete elements in the form of T-bars or chevrons consisting of permalloy which is vapor-deposited deposited on the plate or plates of magnetic material (garnet or orthoferrite), it being possible to form and sustain domains in the plates by means of a main magnetic field directed transversely thereto. These memories are composed of main loops and auxiliary loops.

In the simplified diagram of FIG. 5, the functional elements of the secondary memory are shown and include two units 98, 99. A second embodiment of second conversion unit, designated 18a, of the address conversion device of the present invention is also shown in FIG. 5. Under the control of a sequence of a rotary magnetic field in the plane of the plate, the domains are driven along the domain guide structures, the shape thereof not being shown in detail for the sake of simplicity. If the rotary magnetic field rotates in the positive sense (counter-clockwise), the sources 243, 263 produce a domain in each period. These domains are normally deflected at the diverging switches 244, 264 and are subsequently destroyed in the elements 261, 281. Under the control of a specific rotary field sequence (comprising, for example, a rotation of 7/4 periods in the negative sense) the domains can proceed in the forward direction. The distances 43/44 and 63/63 are unequal, so that the diverging switches 244, 264 can be separately controlled so that synchronization occurs or does not occur between the specific rotary field synchronization for the straight forward travel and the local presence of a domain. This device can furthermore include diverging switches in series connection to form a specific input code having at least two levels. By converging switches 245, 265, the conducted domains arrive in the main loops 296, 297. By diverging switches 246, 248, 250, 266, 268, 270 and converging switches 255, 257, 275, 277, 279, these domains arrive, if desired, in the auxiliary loops 290 through 295. By the diverging switches 256, 258, 260, 276, 278, 280 and the converging switches 247, 249, 251, 267, 271, they arrive in the main loops again and can be detected in the detectors 252, 272. When they are deflected by the diverging switches 253, 273, they can be destroyed in the elements 254, 274. The diverging switches 253, 273 occupy positions which are shifted with respect to each other. Therefore, the coincidence of the specific rotary field sequence for operating a switch and the presence at that time of a domain at a switch location will drive said domain to a bubble annihilator, thus selectively erasing information.

If a given information bit is to be addressed, the physical address is given by the identity of the detector 252, 272 or of the corresponding main loops 296, 297, by the identity of the auxiliary loop 290 through 295 wherein the bit is stored, and by the position in the sequence of the domain positions in the relevant auxiliary loop.

Figure 5A:
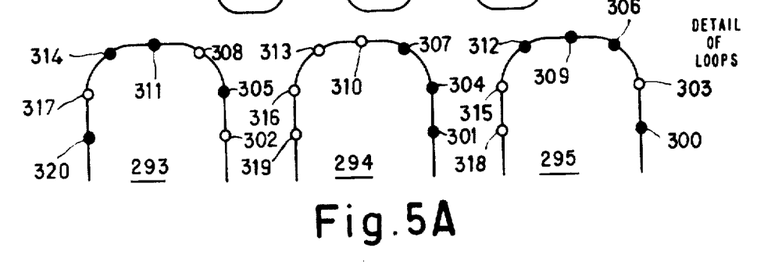
FIG. 5A shows the logical addresses for three auxiliary loops of the bubble storage unit of FIG. 5.

FIG. 5A shows the corresponding logical addresses for three auxiliary loops such as loops 293, 294 and 295, the domains present being represented by dots 320, 314, 311 and 305 in loop 293, and the void domains being represented by circles 317, 308, and 302 in loop 293. In loop 294 domains 307, 304 and 301 are present; domains 319, 316, 313 and 310 are void. In loop 295 domains 312, 309, 306, and 300 are present; domains 318, 315 and 303 are void. Domains of corresponding position are introduced together into the main loop 296, 297, for example the domains 306, 307, 308. These domains successively reach the detector after progressively increasing delay times of, for example, 8, 10, 12 or more periods of the rotary field. Only the data from one detector 252, is fed to the central processor. (+(−

Referring to FIG. 5, second conversion unit 18a is shown within the double-lined box. Assuming there are sixteen domain positions per auxiliary loop; the counter 400 then algebraically counts the number of periods of the rotary field sequence which is controlled by rotary field control unit 442. Counter 400 has 16 positions and therefore keeps continual track of the relative bit positions in the minor loops. The actual rotary field generator is not shown for the sake of simplicity. The counter 400 is capable of counting periods in the positive as well as in the negative sense and is therefore connected to +) and −) outputs of the rotary field control unit 442. If a given domain position is to be addressed, the logical address thereof from the output of first conversion unit 15, registers 154 and 155, as described supra (FIG. 4) is fed to terminals 405, 414, 418; the most significant bit on the terminal 418, the four next-lower bits on the terminals 405, and the least-significant bits on the terminals 414. Thus supplying a logical address to registers 404, 413, 417, which could be combined to form a single register. The logical address per se does not contain data concerning the organization of the physical addresses in the storage unit 98, 99, because this data is derived in the internal structure of the second conversion unit 18a. Simultaneously with the input of the logical address, the terminal 402 receives a positive pulse which sets the flip-flop 401 to the "1"-position, thus activating the comparison unit 403. If the position of the counter 400 corresponds to the information in the register 404, an output signal of the comparison device 403 sets the flip-flop 406 to the "1"-position, supplying one input to "and " gate 407, and resets the flip-flop 401 to the "0" position. Also comparison device 403 (comparator) signals an equality relationship (positive comparison) to rotary field control unit 442, device 442 generates a number of reverse field periods to actuate one or more magnetic bubble switches. Thus, device 442 generates only positive or negative counting pulses, similar to a conventional pulse generator. When the output signal of the comparison device 403 activates the rotary field control device 442, that device supplies the second input to "and" gate 407, thus enabling counter 408 to count eight periods of the rotary field.

The carry output signal of the counter 408 sets the flip-flop 409 to the "1"-position, supplying one input to "and" gate 410, and resets the flip-flop 406 to the "0"-position. As a result, the counter 408 remains in the position zero. These eight periods of the rotary field constitute the delay incurred by the domain between the output of, for example, the auxiliary loop 295 and the detector 272. Subsequently, since rotary field control device 442 is stil activated, it furnishes the second input to "and" gate 410 so that the counter 411 counts the next eight periods of the rotary field sequence. Counter 411 has three bit positions, so it counts from 0 to 7. The higher two positions are compared with the data in the register 413. The comparison device 412 is activated by the output signal of the flip-flop 409. When correspondence occurs, the comparison device 412 supplies a signal whereby the decoder 415 is activated, the flip-flop 409 is set to "0"-position, and the counter 411 is reset to the position zero. The delay of 8, 10, 12, 14 periods in the arrival of the bits is thus implemented (it is assumed that in this case there are four auxiliary loops per main loop). The decoder 415 decodes the position of the (one-bit) register 417 and supplies a pulse on one of the lines 416, so that the information on one of the lines 419, 420 can be applied to the central processor (not shown) through gates (not shown) which correspond to the gates 172 through 175 of FIG. 4. After the read operation, the information can be destroyed. The information can alternatively be rewritten in its previous location. This is possible because the counter 408 has a higher maximum counting position, for example, 64; the first output carry is used as in FIG. 4; the total output carry then sets the flipflop 406 to the "0"-position, and is also applied to the rotary field sequence control unit 442 which activates, in the manner already described for unit 403, the diverging switches 246, 248, 250, 266, 268, 270. During the 64 periods, the information passes through the main loop once and four times through the auxiliary loops, so that the rewritten information returns to its original position. Like the organization of the storage unit shown in FIG. 4, the organization of bubble storage units 98, 99 has no effect on the logical address, except possibly only on the highest permissible logical address. However, all other factors relating to the physical address, such as a number of detectors, the number of auxiliary loops, the number of bits per auxiliary loop, and the initial delay (counter 408) can be changed, together with a different organization within the unit 18a.

The second conversion unit 18a can be connected to the central processor in the same manner as the unit 18 shown in FIGS. 2, 4, so that plug-to-plug compatibility exists. On the other hand, the second conversion unit 18a can also include a calculating member having a more general structure, so that a number of divisions can be directly performed instead of by means of counters as shown in FIG. 5. However, these counters also represent calculating members of a special construction. If the number of auxiliary loops is increased, the comparison unit 412 must receive a plurality of bits, for example, 3; this can be effected by connecting the relevant register, for example 413, to the output of a multiplexer which receives the logical address and which can be readily set by an external special command. In this case the bits for the register sections 404, 417 must also be shifted over one position in the input address.

We claim:

1. A programmable address conversion device for use with computer systems having input means, a central procesor, a central memory, and auxiliary memory units such as disc units, tape units, magnetic bubble units and the like, which receives as input a binary logical representation of a user program address, decodes and demultiplexes the logical address and converts it to a physical address on a specific auxiliary memory unit, comprising:

a first conversion unit which receives as its input a binary word representation of a user program address in terms of a file and an object addressed from an input means;

said first conversion unit comprising:

an input address register which receives said user input address word as a binary logical address;

a first storage unit which receives the first two most significant bits of said logical address from said input address register;

a second storage unit which receives the full binary word of said logical address from said input address register;

said first storage unit containing the initial logical address of the file addressed and the logical length of said file in said auxiliary memory unit;

said secondary storage unit containing logical representations of the rank of the addressed object within said file and the physical length of said file;

a first output register which receives from said secondary storage unit the first basic logical address of an addressed file;

a second output register which receives from said storage unit the binary representations of rank of the object addressed within the file by the user program address;

a calculating member which receives the outputs of said output registers and adds the contents of said output registers to form a generalized logical address;

an accumulator register which receives the results of said programmed calculations;

a control unit to control the operation of said first conversion unit;

said first conversion unit thus serving to decode and demultiplex the logical representation of a user program address; thereby generating a generalized logical address of addressed data in an auxiliary memory unit;

a second conversion unit comprising:

a first input register to receive the generalized logical address output of said first conversion unit for use in calculating the physical address of said addressed data on an auxiliary memory unit;

a first static carry register serving as an input register and containing the number of storage sectors on a subdivision of the auxiliary memory unit;

a second static carry register serving as an input register and containing the number of auxiliary memory units;

a register for storing temporarily the contents of said static carry registers;

said static carry registers thus having as inputs the number of auxiliary memory units, the number of subdivisions thereof, and the number of storage sectors in each subdivision;

a calculating member which performs sequential programmed calculations on the logical address from the first input register and the inputs from the static carry registers, said programmed calculations being based on the generalized logical address from said first conversion unit and the physical parameters of the auxiliary memory unit as stored in said static carry registers;

an output register which receives the final results of the operations of said calculating member in the form of a physical address for the auxiliary memory unit, said physical address having three parts, the number of the auxiliary memory unit addressed, the number of the subdivision of the auxiliary memory unit addressed and the number of the storage sector addressed;

a counter which counts the physical movements of the auxiliary memory unit selected by said physical address;

a register to receive the subdivision portion of said physical address;

a comparator which compares the said portion of the physical address generated by said programmed calculation with the contents of said counter;

a decoder to decode the remainder of the physical address;

a gate unit having a plurality of gates, one of which will be opened by the output of said decoder to permit the addressing of said auxiliary memory unit in terms of a unit; a subdivision and a sector;

said second conversion unit serving to convert generalized logical addresses to physical addresses on said auxiliary memory unit in the form of electrical signals resulting in the operation of said auxiliary memory unit such that data may be read from and written onto a precise physical location.

2. The programmable address conversion device of claim 1 wherein said first storage unit in said first conversion unit contains:

binary numbers representing the first logical addresses of files;

binary numbers representing the logical length of each of said files.

3. The programmable address conversion device of claim 1 wherein said second storage unit in said first conversion unit contains:

binary numbers representing objects within said files;

binary numbers representing the relative rank of said objects within said files.

4. The programmable address conversion device of claim 1 wherein said first and second storage units in said first conversion unit may be one physical unit.

5. The programmable address conversion device of claim 1 wherein the data capacity of a file may be expanded by a program modification of the contents of said first storage unit of said first conversion unit.

6. The programmable address conversion unit of claim 1 wherein the auxiliary memory unit is a disc drive unit comprising:

a plurality of discs;

said unit number representing the number of one of said discs;

each of said discs having the same number of tracks as subdivisions thereof;

said subdivision number representing a track number;

each of said tracks being further subdivided into the same number of sectors for file storage represented by said sector number;

all of said numbers being portions of said physical address;

said number of discs, tracks and sectors being programmed into the static circuit input registers of said second conversion unit;

the contents of said first input register from said first conversion unit serving as the numerator in a programmed division in said calculating member of said second conversion unit;

the contents of said static circuit input registers serving as the denominator in a programmed division in said second conversion unit;

the contents of said output register being received from said calculating member following repeated division operations, the quotient being the track number, the disc number and the sector number, all constituting the physical address on the disc converted from the user program address;

that portion of the output register containing the disc track number being fed to said register which receives the subdivision portion of the physical address, said register serving as a track register;

a comparator which compares the contents of the track register with the contents of said counter to control the operation of said disc unit;

the remaining portion of the output register being fed to said decoder to unblock one of said gates of said gate unit to the magnetic head which reads said track;

the remainder of the last division operation indicating the sector number of said track to be addressed through said unblocked gate;

said second conversion unit having only three variable parameters, the number of disc cylinders, the number of tracks per disc and the number of sectors per track.

7. The programmable address conversion device of claim 1 wherein said calculating member of said first conversion unit is an arithmetic unit of said central processor.

8. The programmable address conversion unit of claim 1 further including means to select logical output addresses on the basis of said user program logical input addresses in said first conversion unit.

9. The programmable address conversion device of claim 1 wherein said auxiliary memory unit is a magnetic tape unit and the three variable parameters of the second conversion unit are tape drive number, tape number and sector number.

10. The programmable address conversion device of claim 1 wherein the auxiliary memory unit is a magnetic bubble unit and the three variable parameters of the second conversion unit are the identity of the main loop, the identity of the auxiliary loop and the position in the sequence of the domain positions in the relevent auxiliary loop.

11. A programmable address conversion device for use with computer systems having an input means, a central processor, a central memory, and auxiliary memory units such as disc units, magnetic bubble units, and the like, which receives as input a binary logical representation of a user program address, decoders and demultiplexes the logical address and converts it to physical address on a specific auxiliary memory unit comprising:

a first conversion unit which receives as its input a binary work representation of a user program address in terms of a file and an object addressed from an input means;

said first conversion unit comprising:

an input address register which receives said user input address word as a binary logical address;

a first storage unit which receives the first two most significant bits of said logical address from said input address register;

a second storage unit which receives the full binary word of said logical address from said input address register;

said first storage unit containing the initial logical address of the file addressed and the logical length of said file in said auxiliary memory unit;

said secondary storage unit containing logical representations of the rank of the addressed object within said file and the physical length of said file;

a first output register which receives from said secondary storage unit the first basic logical address of an addressed file;

a second output register which receives from said first storage unit the binary representations of rank of the object addressed within the file by the user program address;

a calculating member which receives the outputs of said output registers and adds the contents of said output registers to form a generalized logical address;

an accumulator register which receives the results of said programmed calculations;

a control unit to control the operation of said first conversion unit;

said first conversion unit thus serving to decode and demultiplex the logical representation of a user program address; thereby generating a generalized logical address of addressed data in an auxiliary memory unit;

a second conversion unit comprising:

at least one input register to receive the generalized logical address from said first conversion unit;

a rotary field control device;

a first counter which counts the rotary movements of the auxiliary memory unit, counting both positive and negative movements of said rotary field control device;

a first flip-flop set to a "1" position by a positive pulse from a control unit;

a comparison unit activated by the "1" position of said first flip-flop;

said comparison unit comparing the contents of said counter with the least significant bits of said generalized logical address in said input register;

a second flip-flop set to a "1" position by a positive comparison from said comparison unit which also resets said first flip-flop to its original "0" state;

a first "and" gate enabled by said second flip-flop and a positive signal from said rotary field control device;

a second counter enabled by said "and" gate to count eight positive periods and said rotary-field control device;

a third flip-flop set to the "1" position by the carry output of said first counter and resetting said second flip-flop to the "0" position;

a second "and" gate enabled by said third flip-flop in the "1" position and a positive signal from said rotary field control device;

a third counter enabled by said second "and" gate to count to the next eight periods of said rotary field;

a second comparison device to compare the address portion containing the second through fifth most significant bits of the generalized logical address in said input register with the contents of said second counter, said comparison device being activated by the "1" position of said third flip-flop;

a decoder activated by a positive comparison in said second comparison device to decode the most significant bit of said generalized logical address in said input register;

the output of said conversions resulting in a physical address on said auxiliary memory unit, said physical address having three portions, the number of the auxiliary memory unit addressed, the number of the subdivision of the auxiliary memory unit addressed, and the number of the storage sector addressed;

a gate unit having a plurality of gates to said auxiliary memory unit, one of which is unblocked by said physical address to permit the addressing of said auxiliary memory unit in terms of a unit; a subdivision and a sector;

said second conversion unit serving to convert generalized logical addresses to physical addresses on said auxiliary memory unit in the form of electrical signals resulting in the operation of said auxiliary memory unit such that data may be read from and written onto a precise physical location.

12. The programmable address conversion device of claim 11 wherein said first storage unit in said first conversion unit contains:

binary numbers representing the first logical addresses of files;

binary numbers representing the logical length of each of said files.

13. The programmable address conversion device of claim 11 wherein said second storage unit in said first conversion unit contains:

binary numbers representing objects within said files;
binary numbers representing the relative rank of said objects within said files.

14. The programmable address conversion device of claim 11 wherein said first and second storage units in said first conversion unit may be one physical unit.

15. The programmable address conversion device of claim 11 wherein the data capacity of a file may be expanded by a program modification of the contents of said first storage unit of said first conversion unit.

16. The programmable address conversion unit of claim 11 wherein the auxiliary memory unit is a disc drive unit comprising:

a plurality of discs;

said unit number representing the number of one of said discs;

each of said discs having the same number of tracks as subdivisions thereof;

said subdivision number representing a track number;

each of said tracks being further subdivided into the same number of sectors for file storage represented by said sector number;

all of said numbers being portions of said physical address;

said number of discs, tracks and sectors being programmed into said second conversion unit.

17. The programmable address conversion device of claim 11 wherein said calculating member of said first conversion unit is an arithmetic unit of said central processor.

18. The programmable address conversion unit of claim 11 further including means to select logical output addresses on the basis of said user program logical input addresses in said first conversion unit.

19. The programmable address conversion device of claim 11 wherein said auxiliary memory unit is a magnetic tape unit and the three variable parameters of the second conversion unit are tape drive number, tape number and sector number.

20. The programmable address conversion device of claim 11 wherein the auxiliary memory unit is a magnetic bubble unit and the three variable parameters of the second conversion unit are the identity of the main loop, the identity of the auxiliary loop and the position in the sequence of the domain positions in the relevant auxiliary loop.

21. The programmable address conversion device of claim 11 wherein said auxiliary memory unit is a bubble memory and wherein:

said first counter counts the number of periods of a rotary field sequence to keep track of bits positions in the minor loops;

a positive comparison from said first comparator results in said rotary field generator actuating at least one bubble switch;

said second counter counting eight periods of the rotaty field to constitute a delay incurred by the domain of said bubble memory between the output of an auxiliary loop and a detector;

said third counter counting the next eight periods of said rotary field sequence to constitute a second delay in the arrival of bits;

said second counter also causing said rotary field control unit to activate diverging switches;

said data during sixty-four periods passing through a main loop once and through the auxiliary loops four times so that it may be rewritten in its original position.

22. An address conversion device for utilization with a computer system having a central processor unit including a first calculating means, an input means and an output means comprising:

a peripheral storage unit connected to said central processor unit for acting as an auxiliary memory, comprising a plurality of storage sectors in which binary information elements are stored in predetermined storage positions which are each physically consecutively arranged therein; said storage sectors being precisely defined in and addressable by a group of physical address portions, a predetermined number of said storage positions being sequentially accessible under the control of said group of physical address portions;

a first conversion unit connected to said central processor unit comprising storage means for storing a plurality of first logical addresses of files and for storing the relative rank of objects within said files, and addressable by an input address register, and having an output register connected to the input of said central processor unit;

said first conversion unit receiving as input a binary word representing a user program address;

said output register containing the first logical address of the file and relative rank of the object within said file addressed by said user program address;

said first calculating means adding said relative rank of an object within a file to the first logical address of that file to generate a generalized logical address;

a second conversion unit having an input connected to the output of said first calculating means; storage means for storing predetermined parameters characteristic of said peripheral storage unit; second calculating means for deriving said physical address portions for addressing said storage sectors; and an output connected to said peripheral storage unit for supplying said physical address portions to said peripheral storage unit.

23. An address conversion device as claimed in claim 22, wherein said physical addresses of said storage sectors are addresses in a three-dimensional address space.

24. An address conversion device as claimed in claim 22, wherein said peripheral storage unit comprises a number of magnetizable disc surfaces whereon the three physical address portions generated by said address conversion device identify the disc cylinder surface, the track and the sector, respectively.

25. The address conversion device as claimed in claim 22, wherein the peripheral storage unit contains information in the form of magnetic domains, and the physical addresses generated by said device contain the identity of the main loop, the identity of the auxiliary loop and the position in the sequence of domain positions in the relevant auxiliary loop.

26. The address conversion device as claimed in claim 22, wherein said calculating members are part of the central processor.

27. The address conversion device as claimed in claim 22, wherein said address conversion device and said peripheral storage unit are constructed to have common input terminals for the physical address signals and common connection terminals for data transport.

28. The address conversion device of claim 34 wherein said first conversion unit comprises:
- at least one input address register which receives the user program address in a logical form as a binary word representing a file and an object addressed;
- a first storage unit which contains at file addresses, the first logical address of said files and the length of said files within the auxiliary memory unit related to the user program addresses;
- a second storage unit which contains for each user program address the relative rank within the user addressed file of the object designated in the user address and the physical length of the file addressed in the auxiliary memory unit;
- means for the user input address to select the initial logical address of the addressed file from said first storage unit;
- means for the user input address to select the relative rank of the object addressed from said second storage unit;
- a first output register to receive the selected initial logical address;
- a second output register to receive the selected relative rank of the object addressed;
- said output register contents serving as inputs to a calculating member;
- said first conversion unit serving to decode and demultiplex the user program address such that it can serve as input to a calculating member;
- a calculating member which adds said object rank numbers to said first logical addresses to form a generalized logical address which contains no data about the physical position or properties of said auxiliary memory units, but only the rank of the user addressed storage location in the auxiliary memory unit;
- said first conversion unit and calculating member serving to decode and demultiplex a user program address and convert it into a generalized logic address;
- an accumulator register to store the results of said calculating member in the form of a generalized logical address which serves as the input to a second address conversion unit.

29. The address conversion device of claim 22 wherein said second conversion unit comprises:
- a first input register to receive the generalized logical address output of said first conversion unit for use in calculating the physical address of said addressed data on an auxiliary memory unit;
- a first static carry register serving as an input register and containing the number of storage sectors on a subdivision of the auxiliary memory unit;
- a second static carry register serving as an input register and containing the number of auxiliary memory units;
- a register for storing temporarily the contents of said static carry registers;
- said static carry registers thus having as inputs the number of auxiliary memory units, the number of subdivisions thereof, and the number of storage sectors in each subdivision;
- a calculating member which performs sequential programmed calculations on the logical address from the first input register and the inputs from the static carry registers, said programmed calculations being based on the generalized logical address from said first conversion unit and the physical parameters of the auxiliary memory unit as stored in said static carry registers;
- an output register which receives the final results of the operations of said calculating member in the form of a physical address for the auxiliary memory unit, said physical address having three parts, the number of the auxiliary memory unit addressed, the number of the subdivision of the auxiliary memory unit addressed and the number of the storage sector addressed;
- a counter which counts the physical movements of the auxiliary memory unit selected by said physical address;
- a register to receive the subdivision portion of said physical address;
- a comparator which compares the said portion of the physical address generated by said programmed calculation with the contents of said counter;
- a decoder to decode the remainder of the physical address;
- a gate unit having a plurality of gates, one of which will be opened by the output of said decoder to permit the addressing of said auxiliary memory unit in terms of a unit; a subdivision and a sector;
- said second conversion unit serving to convert generalized logical addresses to physical addresses on said auxiliary memory unit in the form of electrical signals resulting in the operation of said auxiliary memory unit such that data may be read from and written onto a precise physical location.

30. The address conversion device of claim 22 wherein said second conversion device comprises:
- at least one input register to receive the generalized logical address from said first conversion unit;
- a rotary field control device;
- a first counter which counts the rotary movements of the auxiliary memory unit, counting both positive and negative movements of said rotary field control device;
- a first flip-flop set to a "1" position by a positive pulse from a control unit;
- a comparison unit activated by the "1" position of said first flip-flop;
- said comparison unit comparing the contents of said counter with the last significant bits of said generalized logical address in said input register;

a second flip-flop set to a "1" position by a positive comparison from said comparison unit which also resets said first flip-flop to its original "0" state;

a first "and" gate enabled by said flip-flop and a positive signal from said rotary field control device;

a second counter enabled by said "and" gate to count eight positive periods of said rotary field control device;

a third flip-flop set to the "1" position by the carry output of said first counter and resetting said second flip-flop to the "0" position;

a second "and" gate enabled by said third flip-flop in the "1" position and a positive signal from said rotary field control device;

a third counter enabled by said second "and" gate to count to the next eight periods of said rotary field;

a second comparison device to compare the address portion containing the second through fifth most significant bits of the generalized logical address in said input register with the contents of said second counter, said comparison device being activated by the "1" position of said third flip-flop;

a decoder activated by a positive comparison in said second comparison device to decode the most significant bit of said generalized logical address in said input register;

the output of said conversions resulting in a physical address on said auxiliary memory unit, said physical address having three portions, the number of the auxiliary memory unit addressed, the number of the subdivision of the auxiliary memory unit addressed, and the number of the storage sector addressed;

a gate unit having a plurality of gates to said auxiliary memory unit, one of which is unblocked by said physical address to permit the addressing of said auxiliary memory unit in terms of a unit; a subdivision and a sector;

said second conversion serving to convert generalized logical addresses to physical addresses on said auxiliary memory unit in the form of electrical signals resulting in the operation of said auxiliary memory unit such that data may be read from and written onto a precise physical location.

31. The address conversion device of claim 22 wherein all of said storage sectors contain the same number of binary information elements.

* * * * *